United States Patent
Bermel et al.

(10) Patent No.: US 8,823,250 B2
(45) Date of Patent: Sep. 2, 2014

(54) HIGH EFFICIENCY INCANDESCENT LIGHTING

(71) Applicants: Peter Bermel, Cambridge, MA (US); Ognjen Ilic, Quincy, MA (US); Walker R. Chan, Cambridge, MA (US); Ahmet Musabeyoglu, Cambridge, MA (US); Aviv Ruben Cukierman, McLean, VA (US); Michael Robert Harradon, Cambridge, MA (US); Ivan Celanovic, Cambridge, MA (US); Marin Soljacic, Belmont, MA (US)

(72) Inventors: Peter Bermel, Cambridge, MA (US); Ognjen Ilic, Quincy, MA (US); Walker R. Chan, Cambridge, MA (US); Ahmet Musabeyoglu, Cambridge, MA (US); Aviv Ruben Cukierman, McLean, VA (US); Michael Robert Harradon, Cambridge, MA (US); Ivan Celanovic, Cambridge, MA (US); Marin Soljacic, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/732,541

(22) Filed: Jan. 2, 2013

(65) Prior Publication Data
US 2014/0042890 A1    Feb. 13, 2014

Related U.S. Application Data

(60) Provisional application No. 61/583,312, filed on Jan. 5, 2012.

(51) Int. Cl.
| H01K 1/04 | (2006.01) |
| H01K 1/14 | (2006.01) |
| B82Y 20/00 | (2011.01) |
| G02B 1/00 | (2006.01) |
| H01K 1/26 | (2006.01) |
| G02B 5/20 | (2006.01) |
| H01K 1/32 | (2006.01) |

(52) U.S. Cl.
CPC .. *H01K 1/26* (2013.01); *H01K 1/14* (2013.01); *B82Y 20/00* (2013.01); *G02B 1/005* (2013.01); *H01K 1/04* (2013.01); *G02B 5/208* (2013.01); *H01K 1/325* (2013.01)
USPC .......................................... 313/110; 313/112

(58) Field of Classification Search
USPC .................................................. 313/110, 112
See application file for complete search history.

(56) References Cited

U.S. PATENT DOCUMENTS 6,087,775 A    7/2000 Levinson
2012/0286643 A1*    11/2012 Ozin ............................ 313/112

FOREIGN PATENT DOCUMENTS

JP    2000268779 A    9/2000
JP    2005276556 A    10/2005
(Continued)

OTHER PUBLICATIONS

Ghebrebhan et al. "Tailoring thermal emission via Q matching of photonic crystal resonances" Phys. Rev. A vol. 83, 033810, (2011).
(Continued)

*Primary Examiner* — Mary Ellen Bowman
(74) *Attorney, Agent, or Firm* — Sam Pasternack; MIT Technology Licensing Office

(57) ABSTRACT

Incandescent lighting structure. The structure includes a thermal emitter that can, but does not have to, include a first photonic crystal on its surface to tailor thermal emission coupled to, in a high-view-factor geometry, a second photonic filter selected to reflect infrared radiation back to the emitter while passing visible light. This structure is highly efficient as compared to standard incandescent light bulbs.

17 Claims, 7 Drawing Sheets

(56) References Cited

FOREIGN PATENT DOCUMENTS

| WO | 2007010462 | A2 | 1/2007 |
|----|------------|----|--------|
| WO | 2009077209 | A2 | 6/2009 |
| WO | 2011057410 | A1 | 5/2011 |

OTHER PUBLICATIONS

Bermel et al. "Tailoring photonic metamaterial resonances for thermal radiation" Nanoscale Research Letters vol. 6, p. 549, (2011).

Araghchini et al. "Fabrication of two-dimensional tungsten photonic crystals for high-temperature applications." J. Vac. Sci. Technol. B29, 061402 (2011).

Belousov et al. Using metallic photonic crystals as visible light sources Phys. Rev. B 86, 174201 (2012).

Y.X. Yeng et al., "Enabling High-Temperature Nanophotonics for Energy Applications," Proc. Natl. Acad. Sci. (2012).

Yablonovitch. "Inhibited spontaneous emission in solid-state physics and electronics" Phys. Rev. Lett. 58 (1987) 2059-62.

John. "Strong Localization 350 of Photons in Certain Disordered Dielectric Superlattices" Phys. Rev. Lett. 58, 2486 (1987).

Fink et al, "A Dielectric Omnidirectional Reflector," Science 282, 1679-1682, Nov. 1998.

Sharpe et al. "A luminous efficiency function, V*(I), for daylight adaptation," Journal of Vision, 5, 948-968 (2005).

Thomas Edison's patent drawing and application for an improvement in electric lamps, patented Jan. 27, 1880; Records of the Patent and Trademark Office; Record Group 241; National Archives.

International Search Report; PCT/US2013/020090 mailed on Apr. 4, 2013.

* cited by examiner

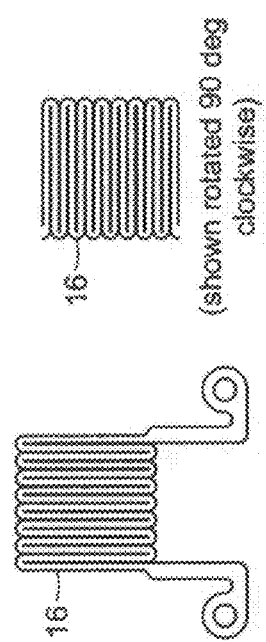
FIG. 4A (shown rotated 90 deg clockwise)
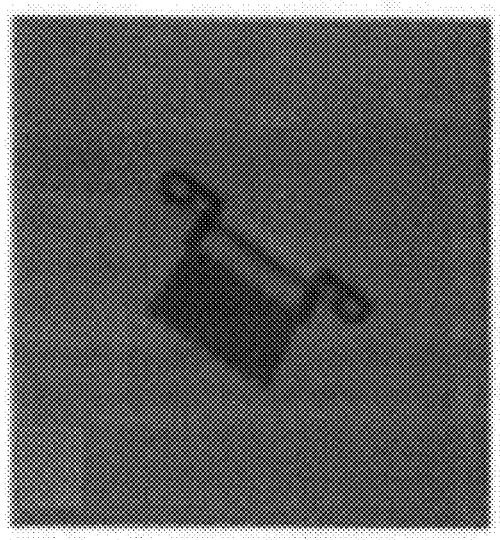
FIG. 4B
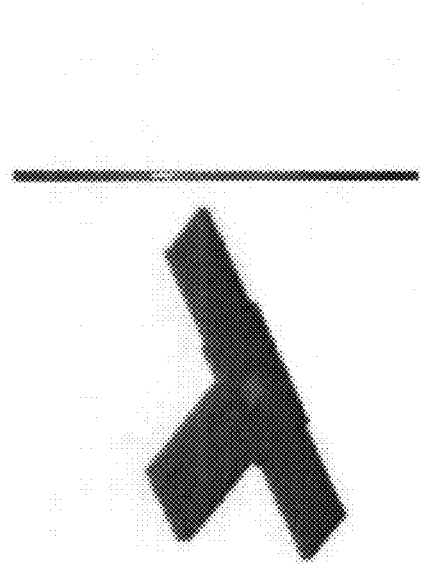
FIG. 5A
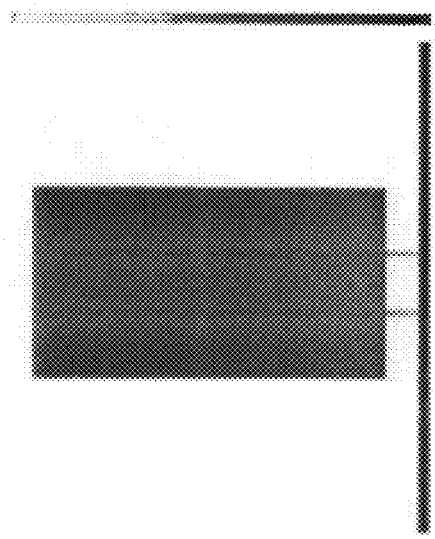
FIG. 5B

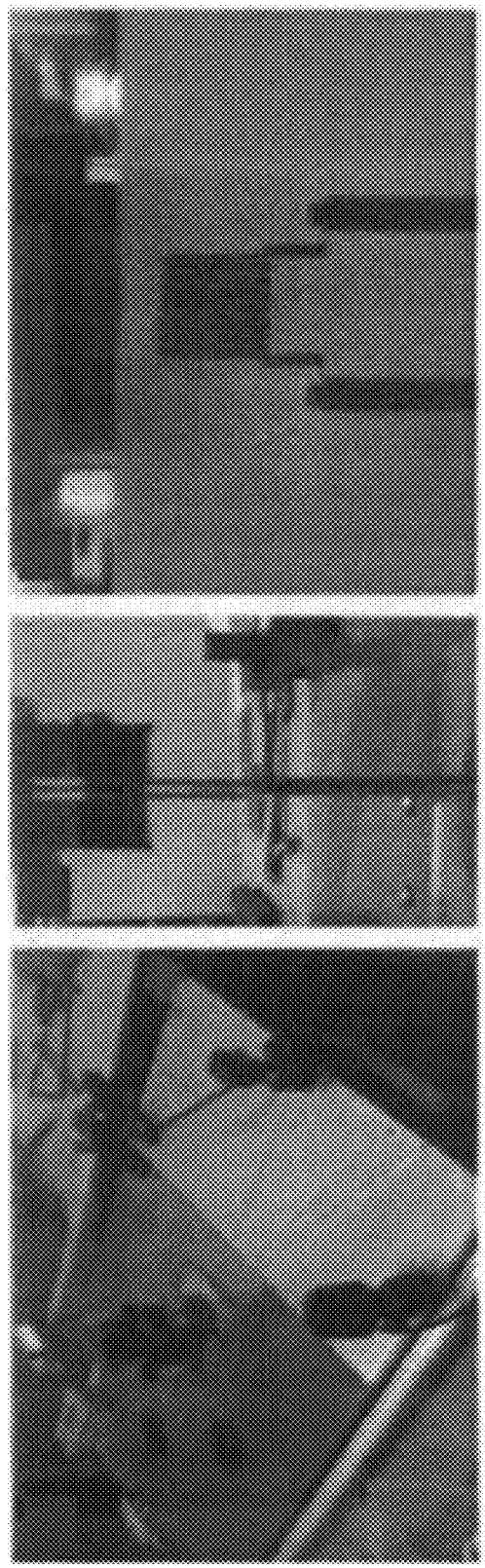

HIGH EFFICIENCY INCANDESCENT LIGHTING

This application claims priority to provisional application No. 61/583,312 filed Jan. 5, 2012, the contents of which are incorporated herein by reference.

This invention was made with government support under Contract No. W911NF-07-D-0004 awarded by the Army Research Office and under Grant Nos. DE-SC0001299 and DE-FG02-09ER46577 awarded by the Department of Energy. The government has certain rights in the invention.

BACKGROUND OF THE INVENTION

This invention relates to incandescent lighting structures that achieve multifold increase in efficiency as compared to standard incandescent light bulbs.

Incandescent light bulbs [1] are the most common source of everyday lighting during the modern era. Unfortunately, incandescent light bulbs are not very efficient. Typically only 2-5% of electrical power ends up in the visible spectrum. The rest is wasted, mostly by radiation into infra-red (IR), and some is also lost into heat. Since close to 25% of generated electrical energy is used for lighting, there are large opportunities for saving power by moving to more efficient light sources: plausible alternatives include fluorescent lighting and LED lighting. In fact, this consideration has already given rise to laws in most major developed economies in Europe, Australia, and US, mandating increased efficiencies for lighting. However, remaining challenges with higher-efficiency lighting offerings include higher fabrication costs, limits to wall-plug efficiency arising from various loss mechanisms, and quality of lighting provided, as measured by the correlated color temperature (CCT) and color rendering index (CRI).

An alternative approach lies in using novel nanophotonic techniques to modify the emission spectrum of a thermal source to something tailored for a particular application [2]. For example, novel nanophotonic mirrors [3, 4] have been discovered that can have properties that dramatically surpass conventional mirrors. Such mirrors can be designed to surround a thermal emitter in order to recycle IR radiation back to its source. Additional, novel nanostructured thermal emitters can be used to directly radiate light at target wavelengths of interest, while suppressing other wavelengths of less relevance.

SUMMARY OF THE INVENTION

The incandescent lighting structure according to the invention includes a thermal emitter coupled to a photonic filter selected to reflect infrared radiation back to the emitter. This photonic filter is called the second photonic filter. The thermal emitter can, but does not have to, include a first photonic crystal on its surface to tailor thermal emission of the emitter. In a possible embodiment, the second photonic filter is a 1D, 2D, or 3D photonic crystal. The second photonic filter may have a photonic band-gap. In one embodiment, the second photonic filter surrounds the emitter. It is also possible that the emitter be a high melting point metal such as tantalum, tungsten or molybdenum.

In another preferred embodiment of the invention the emitter has an approximately rectangular shape sandwiched between two rectangular photonic filters. It is preferred that the second photonic filter form a rugate filter. A suitable rugate filter includes plural periods of two or more materials with different dielectric constants. Suitable materials include silicon dioxide and tantalum pentoxide. In one preferred embodiment, the rugate filter includes 48 periods. In yet another embodiment, the first photonic crystal tailors the thermal emission to enhance visible light emission and to suppress infrared emissions. It is preferred that the second photonic filter selectively recycle infrared photons back to the emitter, while allowing visible light to exit.

The incandescent lighting structure according to the invention provides a manifold increase in efficiency compared to conventional incandescent light bulbs. Novel materials and surface structures can be used to modify thermal emission from a filament to enhance visible emission while suppressing infrared. Appropriately placed rugate filters then selectively recycle infrared photons back to the filament while allowing visible light to exit.

BRIEF DESCRIPTION OF THE DRAWING

FIG. 4A is a schematic illustration of a radiator-like filament design to ensure high resistance.

FIG. 4B is a photograph of a fabricated filament for use in the invention.

FIG. 5A is a graphical illustration of filament target temperature achievable without overheating other regions.

FIG. 5B is an illustration showing that wire leads and cooling block are cooler than a tantalum emitter, well below the copper melting point of 1083° C.

FIG. 8A is a photograph of a prototype of an embodiment of the invention disclosed herein showing a base plate with a filament surrounded by filters.

FIG. 8B is a photograph showing a side view of filament and filters.

FIG. 8C is a photograph showing a front view of the filament and filters.

DESCRIPTION OF THE PREFERRED EMBODIMENT

Figure 1:
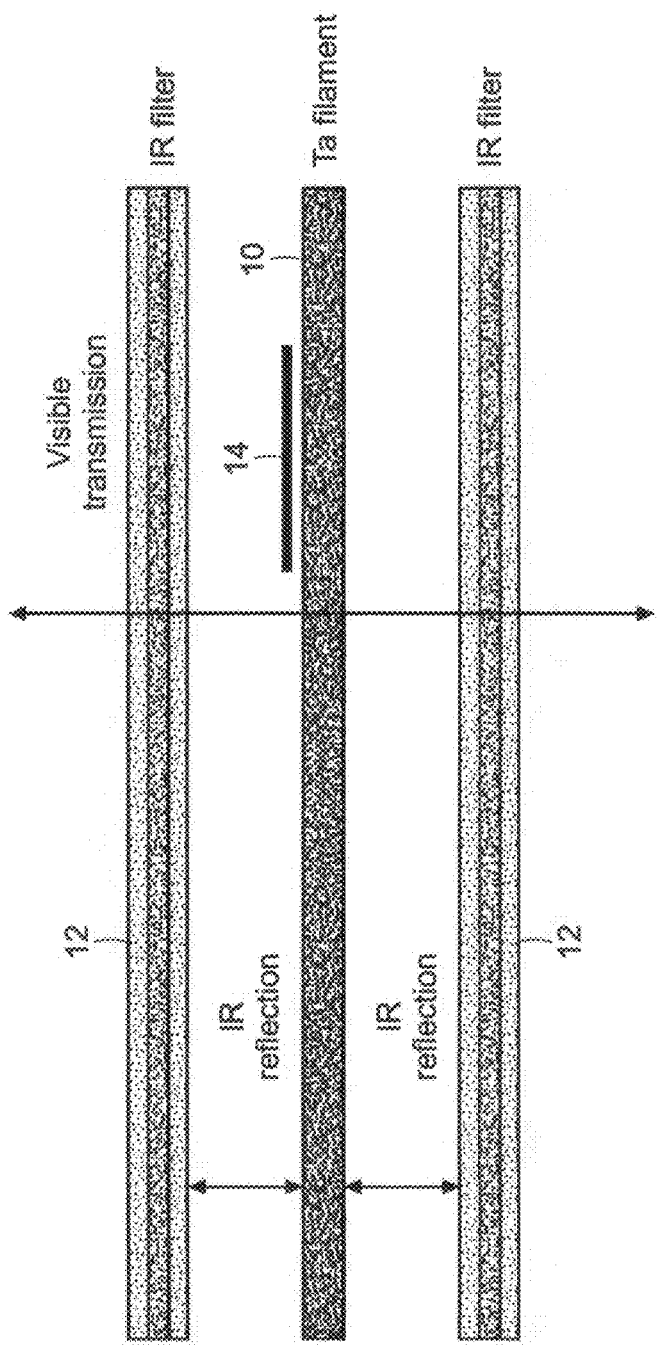
FIG. 1 is a schematic illustration of a rectangular embodiment of the incandescent lighting structure disclosed herein.

The schematic design of the proposed device is shown in FIG. 1. It consists of an emitter 10 surrounded by a photonic filter 12, specially designed to ensure the IR radiation is completely reflected back to the emitter 10, regardless of the angle of incidence. The emitter 10 includes a metal tolerant of high temperatures (e.g., tungsten, tantalum or molybdenum), with or without a photonic crystal 14 on its surface to tailor thermal emission [2]. The periodicity of the photonic filter 12 can be repeated in 1, 2, or 3 dimensions. The device can be implemented in at least two specific geometries: cylindrical and planar. In a cylindrical geometry, the filament is surrounded by a cylindrical filter. The filament can be a tightly wound coil. It is preferred that the filament be extended along the central axis of the cylinder. The filter can be a 1D, or 2D or 3D photonic crystal. The photonic filter can (or does not need to) have a photonic band-gap. Alternatively, omni-directional mirrors [4] can be used. It is important to ensure any reflected radiation will be reflected directly back to the filament, and not to any other side of the filter. This reabsorption is crucial for the efficiency of the device, as it reheats the filament, resulting in less power necessary to keep the filament at the desired temperature. This requirement can be achieved with ordinary materials using an axially symmetric design, or with broadband IR retro-reflecting materials. In a planar geometry, the filament (which can be made of tantalum or tungsten or molybdenum) is approximately rectangular in shape (the exact geometry is shown later in FIG. 3), sandwiched between the two rectangular IR filters. In the cylindrical geometry of the device, there is no specific requirement for the separation between the filament and the filter—assuming axial symmetry (of the filter and the filament) the device efficiency is in principle independent of the separation between the filament and the filter. However, in practice, tolerance for fabrication errors would be higher with smaller filter radii. When the filament is rectangular, it is theoretically and practically necessary to bring the IR filters as close as possible to the filament, to ensure what is called a high view factor, in order to minimize the amount of radiation that can escape off to the side. In our prototype device, the edge length is 1 cm, and the separation is approximately 0.5 mm, resulting in a view factor of approximately 90%.

Figure 2A:
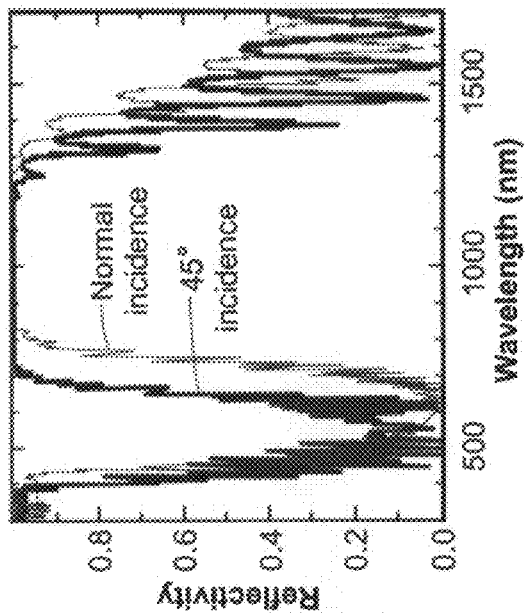
FIG. 2A is a graph of integrated emission versus wavelength showing efficiency of the structure of the invention compared to that of a plain tungsten emitter. The filter consists of four materials, with the highest (lowest) index of refraction of 2.09 (1.46).
Figure 2B:
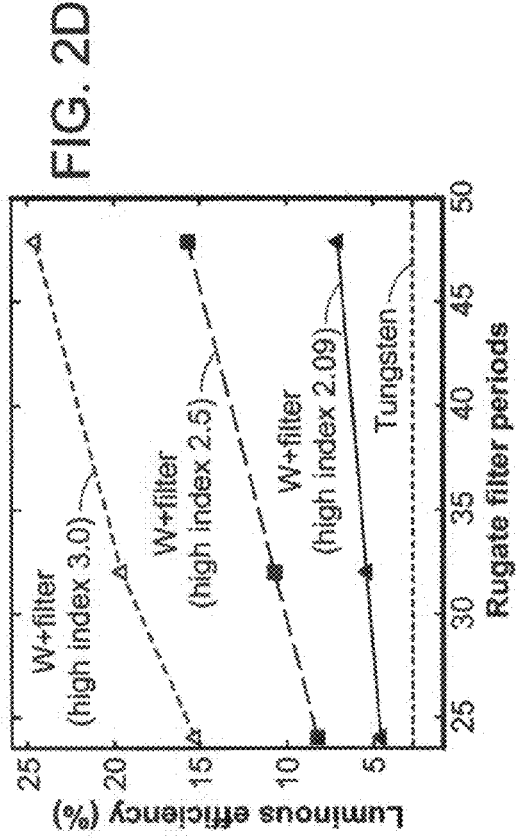
FIG. 2B is a graph of reflectivity versus wavelength showing projected performance of the infrared rugate filter including 48 layers total of silicon dioxide and tantalum pentoxide.
Figure 2C:
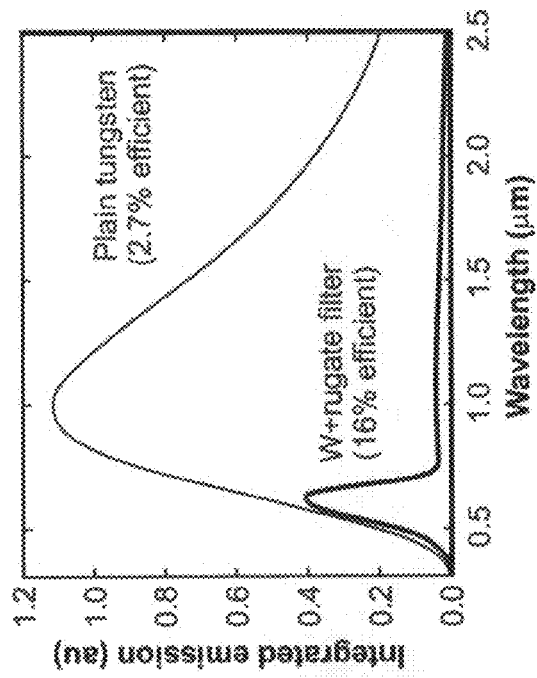
FIG. 2C is a graph of luminous efficiency versus rugate filter periods providing a theoretical comparison of filters with a different number of materials/rugate periods. The highest (lowest) index of refraction is 2.09(1.46).
Figure 2D:
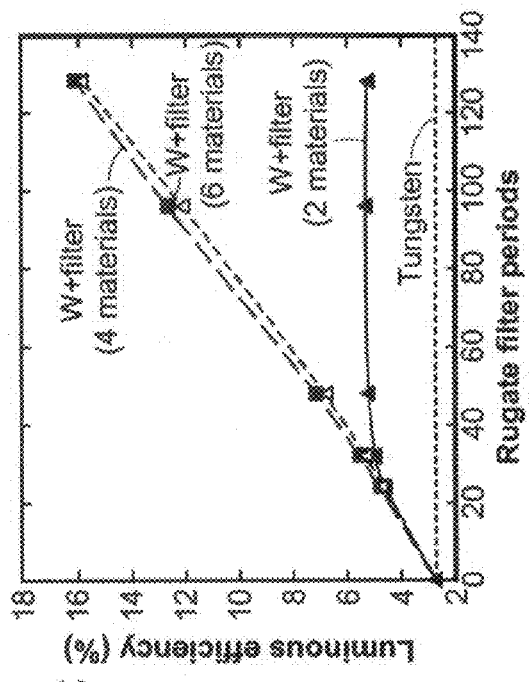
FIG. 2D is a graph of luminous efficiency versus rugate filter periods providing a theoretical comparison of filters made of four materials with a different number of rugate periods and with different dielectric constants (dielectric constant of the lowest-index material is 1.46)

In FIG. 2A, we compare the emission spectra of different thermal emitters. A conventional incandescent light bulb, with a plain tungsten emitter is only 2.7% efficient, due to most of the radiation being emitted in the infra-red spectrum (above 750 nm, thus invisible to the human eye). A significant improvement comes from adding a many-layer IR rugate filter (for this particular filter, system's luminous efficiency is $\eta$=16%). In general, a rugate filter consists of many periods of two or more distinct dielectric materials. The rugate filter in this case consists of 128 periods of silicon dioxide, tantalum pentoxide, and various admixtures of the two, which can generally be written as $Ta_xSi_{1-x}O_{2+0.5x}$. Naturally, using more materials and more filter periods offers greater flexibility and the ability to tailor the emission spectrum to consist of mostly the light in the visible spectrum. The specific reason using more materials is helpful is that it helps suppress higher order reflections, which improves transmission in visible wavelengths. These improvements are highlighted in FIG. 2C. In addition, higher index contrast—the difference between the highest and lowest index of refraction of materials used in the filter—offers substantial improvements in efficiency, as shown in FIG. 2D. For practical implementation, filters with fewer materials and layers are of course easier to fabricate. Restricting ourselves to a rugate filter made of two materials, we find there is an optimal range of period numbers (40-50) where the luminous efficiency is maximized.

The filter we designed and had fabricated by 4wave Inc. consists of 48 layers of low/high index of refraction, specifically silicon-dioxide/tantalum-pentoxide ($SiO_2/Ta_2O_5$), (chosen for their durability, high melting temperature, and low absorption in the visible and near infra-red). Their refractive indices are approximately 1.46 and 2.09 in the visible and near-IR for ion-beam assisted sputter deposition, although there is in practice a small amount of dispersion (included in the simulations). Projected performance of this filter is shown in FIG. 2B, confirming the desired features: strong reflection of light in the near infra-red region (800-1300 nm) and good transmission of the light in the visible spectrum (350-750 nm). Finally, the filter performs well over a broad range of incidence angles, as indicated by the plotted reflectivity for normal as well as 45° incidence. This is particularly important in the planar geometry, where the light from the filament will approach the filter at many different angles.

High view-factor and high operating temperatures strongly contribute to the overall enhancement in efficiency. From FIG. 3A, we see that view-factors of 0.85 (85%) or higher offer strongest improvements. Higher filament temperature increases both the efficiency of bare filament (tungsten or tantalum) as well as the filament surrounded by filters (FIG. 3B), as more of the light spectrum is in the visible. However, this enhancement is particularly high for a filament surrounded by filters, since higher temperature also implies more light in the filter stop-band (the near-IR part of the spectrum, where the filters are particularly reflective).

The cylindrical design we mentioned previously offers particularly strong confinement and reabsorption of infra-red light: nevertheless, the difficulty of fabricating a cylindrically symmetric rugate filter with a large number of filter periods makes this geometry currently less practical. Here, we present a design for a rectangular filament and filter, theoretical predictions for this system, as well as preliminary experimental results.

In a planar geometry, we use a radiator-like design for a rectangular filament 16, shown in FIG. 4. Closely spaced radiator channels ensure that (a) most of the in-plane area is occupied, enabling efficient reabsorption (i.e. most of the reflected photons from the IR filter will hit the filament and be reabsorbed), and (b) the overall resistance of the filament is high enough so that the filament can reach the desired temperature at modest levels of electrical current. Filament dimensions (length, width, thickness) are relevant insofar as they determine the overall ohmic resistance of the filament, which in turn characterizes the equilibrium filament temperature for a given input power. For good system performance, the filament temperature should be higher than 1600, and ideally closer to or higher than 2500° C. so that the thermal emission spectrum of the filament is well matched to the IR filter reflectivity. The filament is designed to operate at voltages at or below 120 V; however, the exact operating voltage can readily be adjusted by using different thicknesses of metal stock. We focus on filaments made of tantalum or tungsten due to their low emissivity in the mid-IR and extremely high melting temperature. However, the concept of a high efficiency, combined filament-IR filter system that we describe is not limited only to metal (such as tantalum, tungsten or molybdenum) filaments. Indeed, the IR rugate filter disclosed herein can be used in combination with other thermal emitters such as 1D/2D tungsten photonic crystals [2], or other nanostructured refractory metal surfaces, in order to suppress infra-red emission and enable reabsorption of infra-red light.

Another important issue in incandescent light bulbs is thermal management: given the (very) high filament operating temperature, we need to ensure the rest of the system is properly thermally managed. Our theoretical predictions show that, despite high filament temperatures, the supporting structure is at much cooler, stable, temperatures. In FIG. 5A, it is shown that copper leads in contact with an insulator tolerant of high temperatures like cubic zirconia will experience relatively low amounts of resistive heating compared to the tantalum filament square, since only the tantalum filament appears hot on the temperature scale on the right, and that what little heat is generated will be dissipated well enough to keep the copper well below its melting point of 1083° C. Furthermore, FIG. 5B, showing the same system from the perspective of the copper leads specifically, shows that the leads in contact with the tantalum filament stay well below 700° C. The overall result is that at least 85% of the input electric power ends up being radiated by the tantalum filament in this design.

Figure 6:
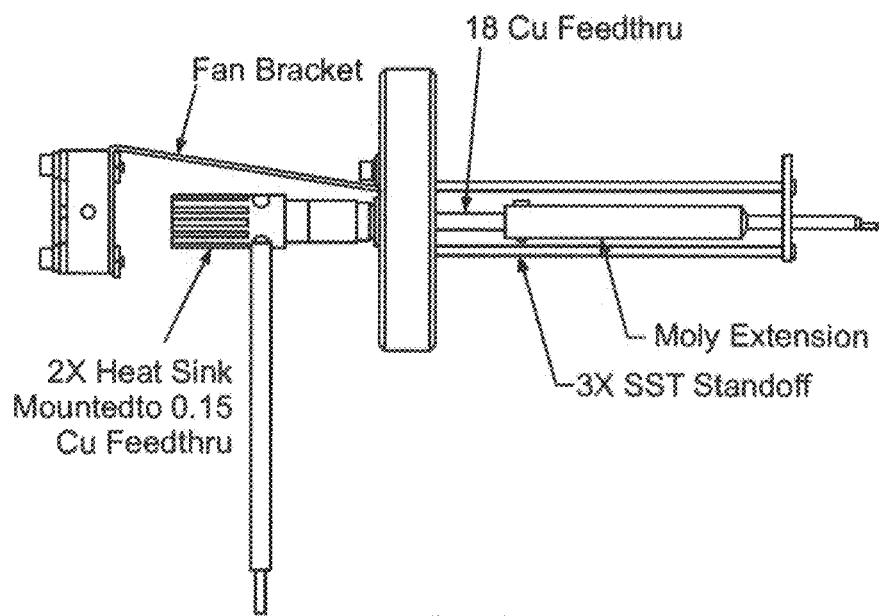
FIG. 6 is a cross sectional view showing a tantalum feed through design for use with invention.

Similar to a regular incandescent light bulb, our device needs to operate in an atmosphere consisting primarily of inert gases, to prevent both oxidation by a significant partial oxygen pressure, or embrittlement from a significant partial hydrogen pressure. In the prototype experimental device we built, we place both the filament and the filter in a vacuum bell jar. The vacuum feedthrough (FIG. 6), specially designed to minimize thermal losses, includes the heat shield, thick copper feedthroughs 18 as well as two heat sinks.

Figure 7:
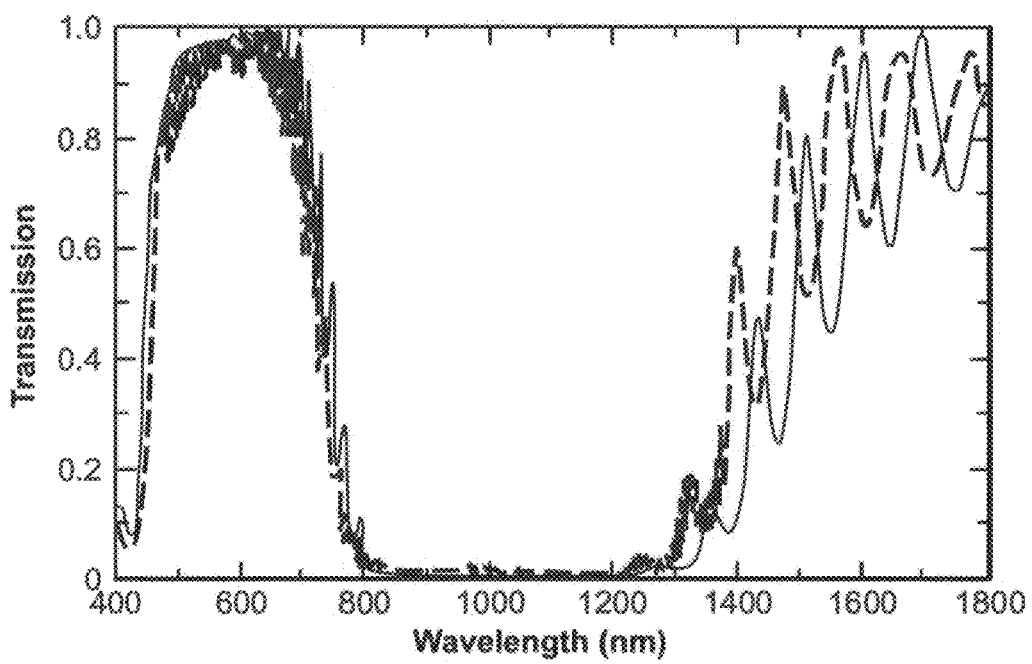
FIG. 7 is a graph of transmission versus wavelength showing predicted and actual custom IR filter performance.

The performance of a filter that we fabricated is shown in FIG. 7. Actual transmission data (shown with dots) are in very good agreement with theoretical calculations (shown as a solid line), particularly in the range of wavelengths of interest (400-1300 nm). The only discrepancy is a slight shift in the filter reflection band edge, which can be explained by a slight change in the thickness of one of the filter boundary layers and/or a very slight systematic error in the deposited thicknesses. The experimental prototype of our device is shown in FIG. 8. The filament and the filters are placed in a glass vacuum chamber, whereas the detectors are outside the chamber, aligned at specific angles of interest. We characterize the performance by measuring the optical spectrum with and without the custom 4Wave filter.

Figure 9A:
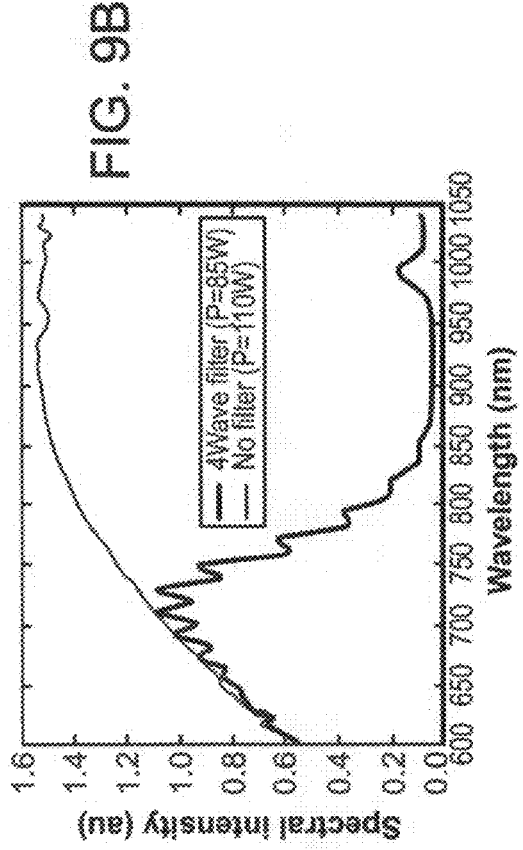
FIG. 9A is a graph of resistance versus input power showing tantalum filament resistivity as a function of input power.
Figure 9B:
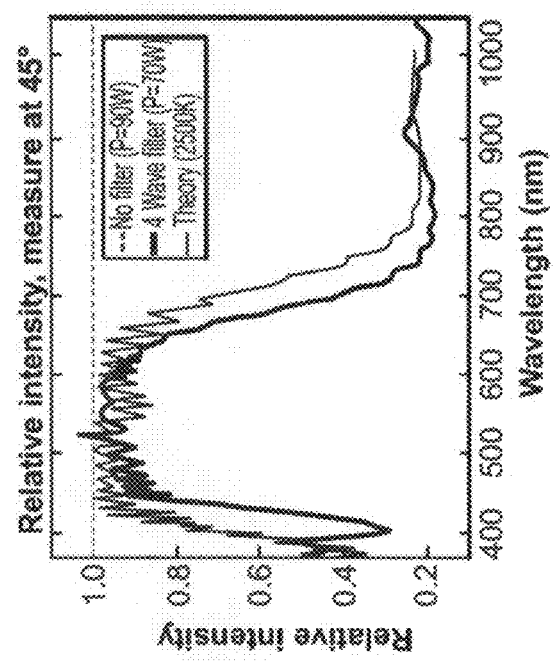
FIG. 9B is a graph of spectral intensity versus wavelength showing calibrated spectral intensity (normal incidence) versus a no-filter case.
Figure 9C:
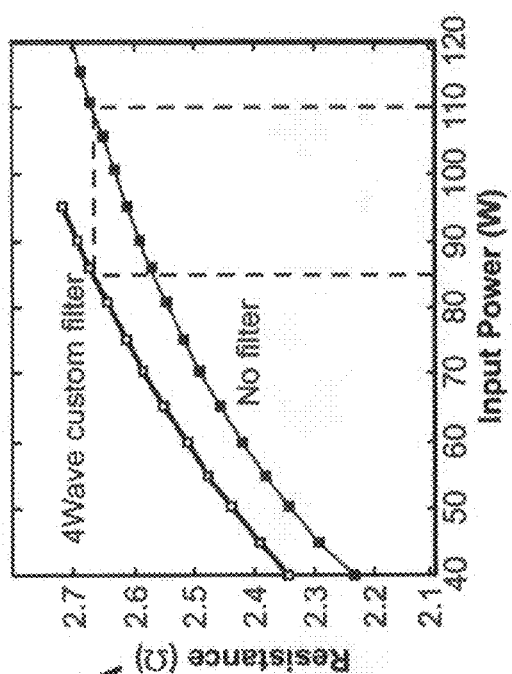
FIG. 9C is a graph of relative intensity against wavelength in which relative intensity (normal incidence) is normalized to the spectrum of a bare filament. The shaded curve corresponds to spectral response of the human eye.
Figure 9D:
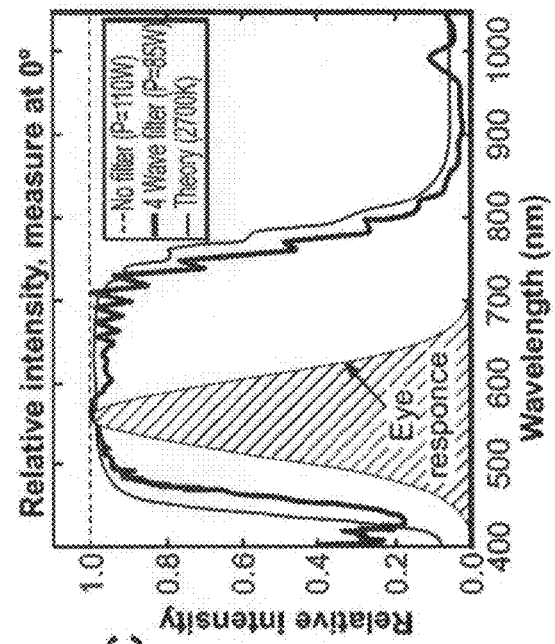
FIG. 9D is a graph of relative intensity against wavelength normalized to the spectrum of the bare filament. The spectrum was measured at the angle of 45 degrees.

Preliminary results agree with our predictions. In FIG. 9A, we plot the resistance of the filament as a function of the input power. When the 4Wave custom filter is present, the resistance of the filament, for the same amount of input power, is noticeably higher than in the case of a bare filament. Higher resistance indicates the filament is at higher temperature, which confirms reabsorption of infra-red photons is taking place, making the filament hotter. For example, in FIG. 9A, we see that at 85 W of input power, the filament surrounded with filters has the same resistance as the bare filament at 110 W input power. We also measure the relative output power and observe significant improvements when the custom IR filter is present (FIG. 9B). For the same case of 85 W vs. 110 W input power, we notice the measured spectrum when the filters are present closely follows the bare filament spectrum for visible wavelengths, but quickly vanishes for near IR wavelengths, as expected. This is further confirmed in FIGS. 9C, D, where in order to eliminate any uncertainty in spectrometer calibration, we plot the ratio of detected spectrum intensity for the with-filter and bare filament cases. We make two observations: first, experimental data closely matches our theoretical predictions, increasing our confidence in our theoretical model. Second, the filter performs particularly well in the wavelength range where the human eye is most sensitive. When the response of the human eye is taken into account, data from FIG. 9C allows us to make the following statement: at 85 W of input power (when filters are present), the human eye detects 97% of the light energy emitted by the bare filament at 110 W input power. While this data is extracted for light detected at normal incidence, similar conclusions apply for non-zero angle detection. For the spectrum detected at 45 degrees—shown in FIG. 9D—both the match between theory and experiment as well as strong performance in the relevant wavelength range remain true. In this case, the ratio of detected light energy is 93%. Somewhat weaker performance (relative to 97% at normal incidence) is attributed to lower filament temperature, due to lower input power (70 W vs 85 W).

Figure 3B:
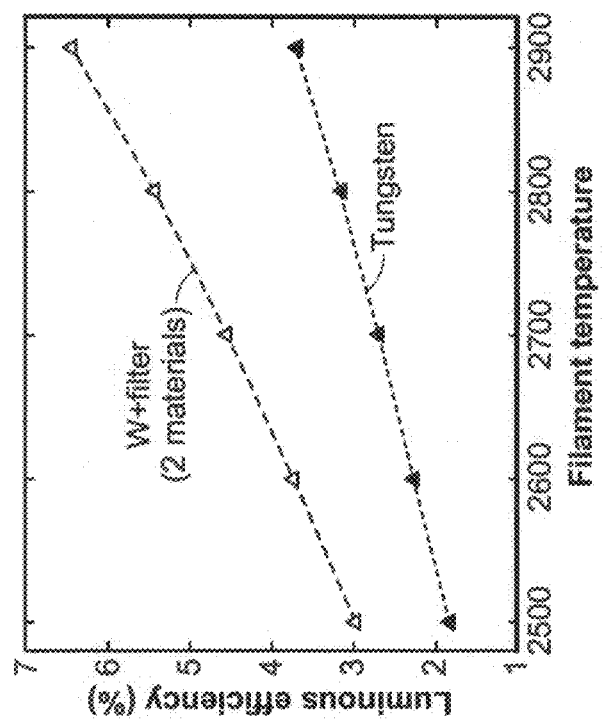
FIG. 3B is a graph of luminous efficiency versus filament temperature showing the dependence of efficiency on filament temperature. Temperature is in Kelvins. The filter consists of two materials with refractive indices of 2.09 and 1.46, respectively

Performance of our system can be improved by reaching higher filament operating temperatures (see FIG. 3B). We believe filament outgassing at high temperatures and in low-pressure environments is the most important cause for filter darkening, preventing us from reaching the desired filament temperatures. In order to significantly reduce the outgassing, we are introducing an inert-gas environment, consisting of either argon or nitrogen, to our setup.

As tantalum and tungsten become more ductile at high temperatures, the filament starts to bend under its own weight. In principle, our system can operate in any orientation. For the system with rectangular geometry an added requirement is that the separation between the filter and the filament is small enough, and the two do not touch. However, a sagging horizontal filament loses its planar geometry, making it hard to bring the filters close enough to achieve high view factors. We solve this problem by orienting the filament vertically. Another potential way to solve this problem is to introduce various impurities/dopants (such as, but not limited to, Al, K, Si, rhenium, thorium, . . . ) to tantalum or tungsten. The purpose of these dopants is to limit the grain growth in metal at high temperature, and improve metal's mechanical stability.

Our novel design disclosed herein forms the basis for a dramatically more efficient incandescent lighting system, capable of manifold increase in efficiency compared to conventional incandescent light bulbs. The disclosed structures can achieve an efficiency of 16% which is more than five times higher than the standard incandescent bulbs operating at the same temperature. It uses two components: first, an emitter such as a filament (that can have a surface structure or novel materials to modify thermal emission to enhance visible emission while suppressing infrared), and second, appropriately placed rugate filters to selectively recycle infrared photons back to the emitter, while allowing visible light to exit. Our experimentally built thermal emitter consists of tantalum and tungsten arranged in a winding square pattern, but the principle behind the combined filament-IR filter system, can be applied to a broad range of novel materials and surface nanostructures as well. Our experimentally fabricated rugate filter consists of 48 layers of silicon dioxide and tantalum pentoxide, which is shown both theoretically and experimentally to offer strong reflection in the near-IR with strong transmission at visible wavelengths. Initial measurements of all the interacting elements in our prototype device indicate strong enhancements in optical power, particularly at the critical visible wavelengths near 550 nm, as well as higher filament resistances, confirming greater heating of the filament in the presence of the filter, strongly supporting our hypothesis that significant energy can be reabsorbed from the infra-red photons.

Figure 3A:
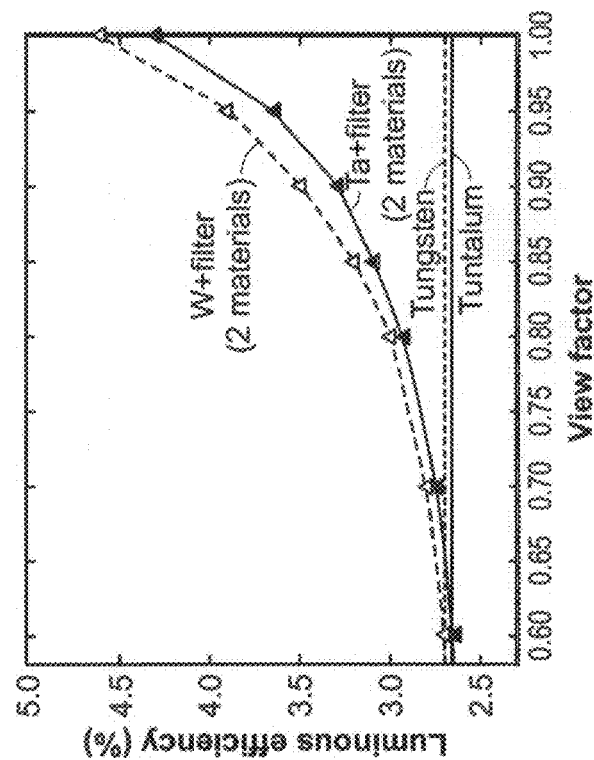
FIG. 3A is a graph of luminous efficiency versus view factor showing the dependence of efficiency on the view factor. The filter consists of two materials with refractive indices of 2.09 and 1.46, respectively. Smaller filter-filament distance corresponds to higher view factor.

We summarize some main factors that contribute to the increase in efficiency of our system: dielectric contrast (the difference between the highest and the lowest index of refraction of materials used in the second photonic filter), filament temperature, number of layers/periods/materials in the second photonic filter, and the view-factor between the filament and the filter. As shown in FIGS. 2 and 3, all of these factors independently control the overall enhancement. For example, a system including a tungsten filament at 2700 degrees Kelvin, coupled to a second photonic filter consisting of 4 materials, with dielectric contrast of 2.09 (high index) and 1.46 (low index) can theoretically reach higher than five times the efficiency of a conventional tungsten filament. However, it is important to note that this number would be: lower if the view-factor is lower (in accordance with FIG. 3A), higher if the temperature is higher (in accordance with FIG. 3B), lower if the number of materials is lower (in accordance with FIG. 2C), higher if dielectric contrast is higher (in accordance with FIG. 2D), and so on. The main principle behind our system is that the combination of a thermal emitter and a photonic filter, in a high-view-factor geometry, allows for recycling of infra-red light, thus increasing the system's efficiency in converting electric power to visible light. The exact numerical increase in efficiency, however, depends on multiple factors as described above.

The numbers in square brackets correspond to the references listed herewith. The contents of all of these references are incorporated herein by reference.

It is recognized that modifications and variations of the invention disclosed herein will be apparent to those of ordinary skill in the art and it is intended that all such modifications and variations be included within the scope of the appended claims.

REFERENCES

1. Thomas Edison's patent drawing and application for an improvement in electric lamps, patented Jan. 27, 1880; Records of the Patent and Trademark Office; Record Group 241; National Archives.
2. Ghebrebhan et al. "Tailoring thermal emission via Q matching of photonic crystal resonances" Phys. Rev. A Vol. 83, 033810, (2011); also Bermel et al. "Tailoring photonic metamaterial resonances for thermal radiation" Nanoscale Research Letters Vol. 6, p. 549, (2011); also Araghchini et al. "Fabrication of two-dimensional tungsten photonic crystals for high-temperature applications," J. Vac. Sci. Technol. B29, 061402 (2011); also Belousov et al. "Using metallic photonic crystals as visible light sources" Phys. Rev. B 86, 174201 (2012)"; and Y. X. Yeng et al., "Enabling High-Temperature Nanophotonics for Energy Applications," Proc. Natl. Acad. Sci. (in press).
3. See E. Yablonovitch, "Inhibited spontaneous emission in solid-state physics and electronics" Phys. Rev. Lett. 58 (1987) 2059-62, as well as S. John. "Strong Localization of Photons in Certain Disordered Dielectric Superlattices" Phys. Rev. Lett. 58, 2486 (1987).
4. Fink, Y. Win J. N., Fan, S., Michel. J., Chen, C., Joannopoulos, J. D., Thomas, E. L., "A Dielectric Omnidirectional Reflector," Science 282, 1679-1682, November 1998.
5. http://www.osram.com/osram_com/Tools_%26_Services/Calculators_and_Consultants/I RC_Saver_calculator/index.html
6. General Electric Patent U.S. Pat. No. 6,087,775
7. Sharpe, L. T., Stockman, A., Jagla, W. & Jägle, H., "A luminous efficiency function, V*(1), for daylight adaptation," Journal of Vision, 5, 948-968 (2005).

What is claimed is:

1. Incandescent lighting structure comprising a thermal emitter coupled to, in a high-view-factor geometry, a photonic filter selected to reflect infrared radiation back to the emitter while passing visible light, wherein the photonic filter includes two or more materials with different dielectric constants with more than 80 layers.

2. The lighting structure of claim 1 wherein the thermal emitter includes a photonic crystal on its surface to tailor thermal emission.

3. The lighting structure of claim 1 wherein the photonic filter is a 1D, 2D or 3D photonic crystal.

4. The lighting structure of claim 1 wherein the photonic filter has a phototonic band gap.

5. The lighting structure of claim 1 wherein the photonic filter surrounds the emitter.

6. The lighting structure of claim 1 wherein the emitter is a high melting point metal.

7. The lighting structure of claim 6 wherein the metal is tantalum or tungsten or molybdenum.

8. The lighting structure of claim 1 wherein the thermal emitter is disposed within a cylindrical photonic filter.

9. The lighting structure of claim 8 wherein the thermal emitter is a tightly wound coil.

10. The lighting structure of claim 1 wherein the emitter has an approximately rectangular shape sandwiched between two rectangular photonic crystal filters.

11. The lighting structure of claim 10 wherein the photonic crystal filters are disposed with respect to the emitter to assure a view factor higher than 85%.

12. The lighting structure of claim 1 wherein the photonic filter forms a rugate filter.

13. The lighting structure of claim 12 wherein the rugate filter comprises silicon dioxide and tantalum pentoxide.

14. The lighting structure of claim 12 wherein the rugate filter includes 48 alternating layers of silicon dioxide and tantalum pentoxide.

15. The lighting structure of claim 10 wherein the emitter includes closely spaced radiator channels.

16. The lighting structure of claim 1 wherein emitter temperature is higher than 1600 degrees C.

17. The lighting structure of claim 2 wherein the photonic crystal tailors the thermal emission to enhance visible light emission and to suppress infrared emission.

* * * * *